United States Patent
Tai et al.

(10) Patent No.: US 9,932,428 B2
(45) Date of Patent: Apr. 3, 2018

(54) THERMOPLASTIC RESIN COMPOSITION AND MOLDING PRODUCT MADE THEREFROM

(71) Applicant: Chi Mei Corporation, Tainan (TW)

(72) Inventors: Chia-Hon Tai, Tainan (TW); Po-Shih Wang, Tainan (TW); Chen-Dao Wu, Tainan (TW); Jui-Hsi Hsu, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 15/176,159

(22) Filed: Jun. 8, 2016

(65) Prior Publication Data

US 2017/0190817 A1     Jul. 6, 2017

(30) Foreign Application Priority Data

Dec. 30, 2015 (TW) .............................. 104144498 A

(51) Int. Cl.
| | |
|---|---|
| *C08F 212/08* | (2006.01) |
| *C08F 212/10* | (2006.01) |
| *C08G 18/67* | (2006.01) |
| *C08G 18/79* | (2006.01) |
| *C08G 18/24* | (2006.01) |
| *C08F 299/06* | (2006.01) |
| *C08F 290/06* | (2006.01) |
| *C08F 220/34* | (2006.01) |

(52) U.S. Cl.
CPC .......... *C08F 212/08* (2013.01); *C08F 212/10* (2013.01); *C08G 18/246* (2013.01); *C08G 18/673* (2013.01); *C08G 18/6725* (2013.01); *C08G 18/792* (2013.01); *C08F 290/067* (2013.01); *C08F 299/065* (2013.01); *C08F 2220/343* (2013.01); *C08F 2500/11* (2013.01); *C08F 2800/20* (2013.01)

(58) Field of Classification Search
CPC .................. C08F 212/02; C08F 212/10; C08F 2220/343; C08F 290/067; C08F 290/147; C08F 299/065
See application file for complete search history.

(56) References Cited

U.S. PATENT DOCUMENTS

| | | | |
|---|---|---|---|
| 4,480,079 A | * 10/1984 | Orton .................. | C08F 290/147 526/301 |
| 2009/0143499 A1 | 6/2009 | Chang et al. | |
| 2012/0208000 A1 | * 8/2012 | Yoshioka .............. | C08F 285/00 428/220 |

FOREIGN PATENT DOCUMENTS

| | | | |
|---|---|---|---|
| JP | 2002012640 A | * | 1/2002 |
| JP | 2012-062357 | | 3/2012 |
| JP | 2013127056 | | 6/2013 |

(Continued)

OTHER PUBLICATIONS

Document N_English Translation.*
"Office Action of Taiwan Counterpart Application", dated Jul. 12, 2016, p. 1-p. 7, in which the listed references were cited.

*Primary Examiner* — Michael L Leonard
(74) *Attorney, Agent, or Firm* — JCIPRNET

(57) ABSTRACT

A thermoplastic resin composition and a molding product made therefrom are provided. The thermoplastic resin composition includes a branched copolymer obtained from a copolymerization of a urethane compound and a copolymerizable monomer, wherein the urethane compound is obtained from reaction of a (meth)acrylate compound containing hydroxyl group and a triisocyanate compound.

12 Claims, 4 Drawing Sheets

(56) References Cited

FOREIGN PATENT DOCUMENTS

| TW | 513443 | 12/2002 |
|---|---|---|
| TW | 567191 | 12/2003 |
| TW | I240740 | 10/2005 |

* cited by examiner

THERMOPLASTIC RESIN COMPOSITION AND MOLDING PRODUCT MADE THEREFROM

CROSS-REFERENCE TO RELATED APPLICATION

This application claims the priority benefit of Taiwan application serial no. 104144498, filed on Dec. 30, 2015. The entirety of the above-mentioned patent application is hereby incorporated by reference herein and made a part of this specification.

BACKGROUND OF THE INVENTION

1. Field of the Invention

The invention generally relates to a thermoplastic resin composition, in particular, to a thermoplastic resin composition and a molding product made therefrom.

2. Description of Related Art

In recent years, thermoplastic resin was shown to have good molding properties, physical and mechanical properties. In particular, one of its features is to have a good appearance and gloss in the molded product. Therefore, thermoplastic resin has been widely applied in different fields, such as in household appliances, mechanical parts, office supplies, electronic components and in the automotive industry etc.

In general, thermoplastic resin can be processed by using molding methods such as injection molding, extrusion molding and blow extension molding etc. In addition, during specific molding processes, the resin needs to be compressed into a sheet prior to molding. In order to fulfill such a requirement, the resin needs to have a high melt strength (i.e., increase the molecular weight of the resin), such that a good thickness uniformity and dimension stability during thermoforming or vacuum forming can be maintained.

However, after increasing the molecular weight of the resin, many drawbacks may arise such as the decrease in mobility, deterioration of the molding properties and reduced productivity etc. To overcome such drawbacks, a general way is to add branching agents for improving the properties. In conventional techniques, the added branching agents are selected from multifunctional reactive monomers such as divinyl compounds or polyvalent acrylate compounds. However, when such monomers are used in the manufacturing process, although the drawbacks such as the decrease in mobility and deterioration of the molding properties may be prevented, it may also cause the cross-linking of the resin such that it is attached to the pipeline surface and result in the formation of carbides. As such, the manufacturing process becomes unsuccessful and the hue of the obtained resin is poor.

Accordingly, how to make a molding product having high melt tension to aid in the thinning processing and to improve the production stability is an issue that a person skilled in the art seeks to resolve.

SUMMARY OF THE INVENTION

Accordingly, the invention is directed to a thermoplastic resin composition including branched copolymers, wherein the molding product can have a high melt tension to aid in the thinning processing and to improve production stability.

The invention also provides a molding product formed by the above thermoplastic resin composition.

The thermoplastic resin composition of the invention includes a branched copolymer obtained by the copolymerization of a urethane compound and a copolymerizable monomer, wherein the urethane compound is obtained by the reaction of a (meth)acrylate compound containing hydroxyl group with a triisocyanate compound.

In an embodiment of the invention, the triisocyanate compound is represented by Formula (1),

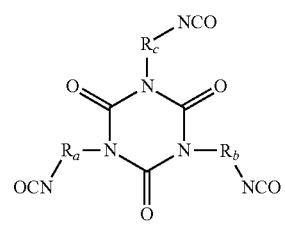

Formula (1)

in Formula (1), $R_a$, $R_b$, $R_c$ each independently represents —$(CH_2)_n$—, and n is an integer of 2 to 12.

In an embodiment of the invention, the (meth)acrylate compound containing hydroxyl group is at least one selected from the group consisting of 2-hydroxyethyl acrylate, pentaerythritol triacrylate and caprolactone acrylate.

In an embodiment of the invention, the urethane compound is represented by Formula (2),

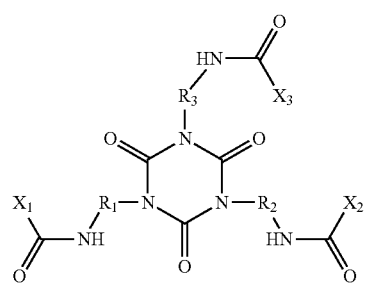

Formula (2)

in Formula (2), $R_1$, $R_2$, $R_3$ each independently represents —$(CH_2)_n$—, wherein n is an integer of 2 to 12, $X_1$, $X_2$ and $X_3$ each independently is selected from the group consisting of a residue obtained by removing a hydrogen from a hydroxyl group of 2-hydroxyethyl acrylate, a residue obtained by removing a hydrogen from a hydroxyl group of pentaerythritol triacrylate and a residue obtained by removing a hydrogen from a hydroxyl group of caprolactone acrylate.

In an embodiment of the invention, in Formula (2), $R_1$, $R_2$, $R_3$ each independently represents —$(CH_2)_n$—, and n is an integer of 2 to 10.

In an embodiment of the invention, in Formula (2), $R_1$, $R_2$, $R_3$ each independently represents —$(CH_2)_n$—, and n is an integer of 4 to 8.

In an embodiment of the invention, in Formula (2), $R_1$, $R_2$, $R_3$ each independently represents —$(CH_2)_n$—, and n is 6.

In an embodiment of the invention, based on an amount of the copolymerizable monomer being 100 parts by weight, an amount of the urethane compound is 0.005 parts by weight to 0.8 parts by weight.

In an embodiment of the invention, based on an amount of the copolymerizable monomer being 100 parts by weight, an amount of the urethane compound is 0.01 parts by weight to 0.4 parts by weight.

In an embodiment of the invention, when the molar mass of the branched copolymer is in the range of $2\times10^5$ g/mol to $3\times10^6$ g/mol, the average radius of gyration is 30 nm to 50 nm.

In an embodiment of the invention, the copolymerizable monomer is at least one selected from the group consisting of a styrene based monomer, an acrylonitrile based monomer and a (meth)acrylate based monomer.

In an embodiment of the invention, the weight average molecular weight of the branched copolymer is 100,000 to 600,000.

A molding product of the invention is formed by the thermoplastic resin composition described above.

Based on the above, the thermoplastic resin composition of the invention includes a branched copolymer obtained by the copolymerization of a urethane compound and a copolymerizable monomer, wherein the urethane compound has the effect of a branching agent during polymer synthesis. As such, it can be used for the reaction with the copolymerizable monomer to synthesize the branched copolymer when a molar mass is in the range of $2\times10^5$ g/mol to $3\times10^6$ g/mol, an average radius of gyration is 30 nm to 50 nm. As a result, the molding product has a high melt tension to aid in the thinning processing and to improve production stability.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
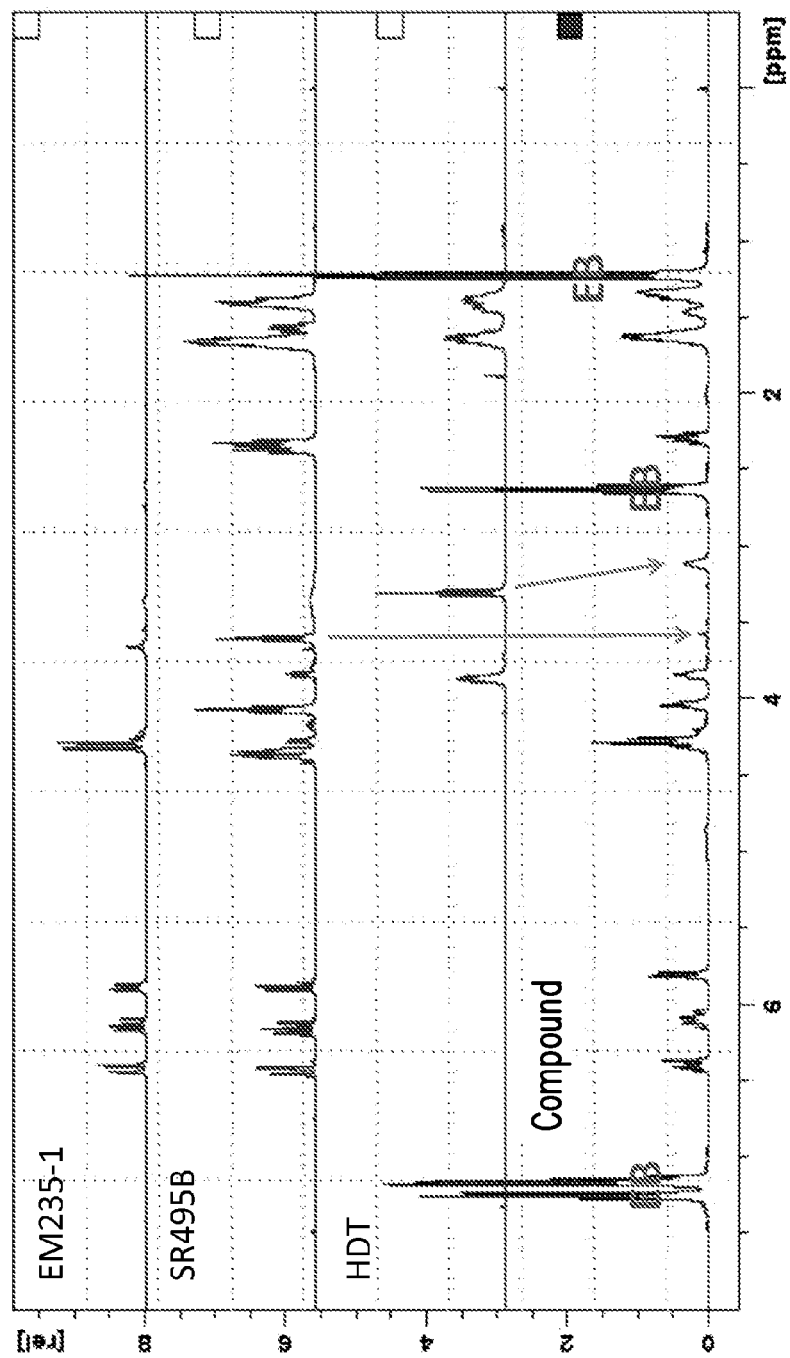
FIG. 1 is a $^1$H-NMR spectrum of the urethane compound obtained in synthesis example 1.

Reference will now be made in detail to the present preferred embodiments of the invention, examples of which are illustrated in the accompanying drawings. Wherever possible, the same reference numbers are used in the drawings and the description to refer to the same or like parts.

It should be mentioned that in the specification and claims of the invention, "(meth)acrylate" represents "acrylate" and/or "methacrylate".

The invention provides a thermoplastic resin composition including a branched copolymer obtained by the copolymerization of a urethane compound and a copolymerizable monomer, wherein the urethane compound is obtained by the reaction of a (meth)acrylate compound containing hydroxyl group with a triisocyanate compound. The mentioned components will be described in detail below.

<(Meth)Acrylate Compound Containing Hydroxyl Group>

The (meth)acrylate compound containing hydroxyl group of the invention is at least one selected from the group consisting of 2-hydroxyethyl acrylate (HEA), pentaerythritol triacrylate (PETIA), and caprolactone acrylate.

2-Hydroxyethyl acrylate is represented by the following formula.

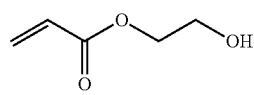

Pentaerythritol triacrylate is represented by the following formula.

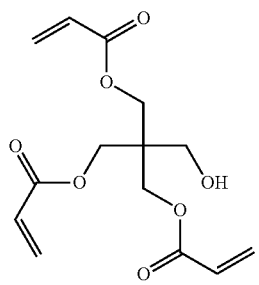

Specific example of the caprolactone acrylate is represented by the following formula.

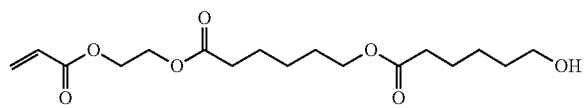

<Triisocyanate Compound>

The triisocyanate compound of the invention is represented by Formula (1),

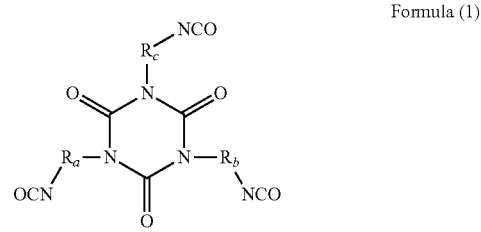

Formula (1)

in Formula (1), $R_a$, $R_b$, $R_c$ each independently represents —$(CH_2)_n$—, wherein n is an integer of 2 to 12.

More specifically, in Formula (1), $R_a$, $R_b$, $R_c$ each independently represents —$(CH_2)_n$—, preferably n is an integer of 2 to 10, more preferably n is an integer of 4 to 8, and even more preferably n is 6.

A specific example of the triisocyanate compound is represented by the following formula.

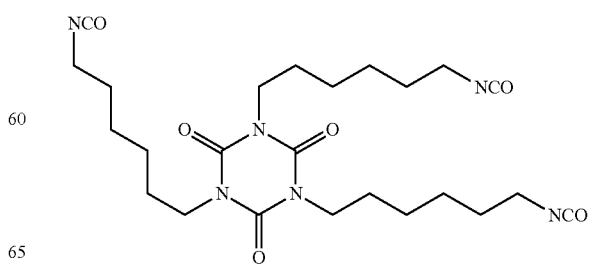

<Urethane Compound>

The urethane compound of the invention is represented by Formula (2),

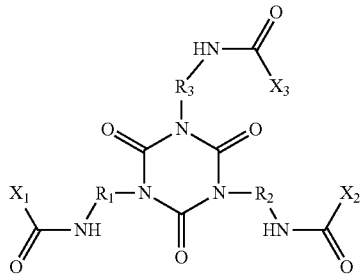

Formula (2)

in Formula (2), $R_1$, $R_2$, $R_3$ each independently represents —$(CH_2)_n$—, wherein n is an integer of 2 to 12, $X_1$, $X_2$ and $X_3$ each independently is selected from the group consisting of a residue obtained by removing a hydrogen from a hydroxyl group of 2-hydroxyethyl acrylate, a residue obtained by removing a hydrogen from a hydroxyl group of pentaerythritol triacrylate and a residue obtained by removing a hydrogen from a hydroxyl group of caprolactone acrylate.

More specifically, in Formula (2), $R_1$, $R_2$, $R_3$ each independently represents —$(CH_2)_n$—, preferably n is an integer of 2 to 10, more preferably n is an integer of 4 to 8, and even more preferably n is 6.

The urethane compound of the invention can be represented by Formula (3) or Formula (4),

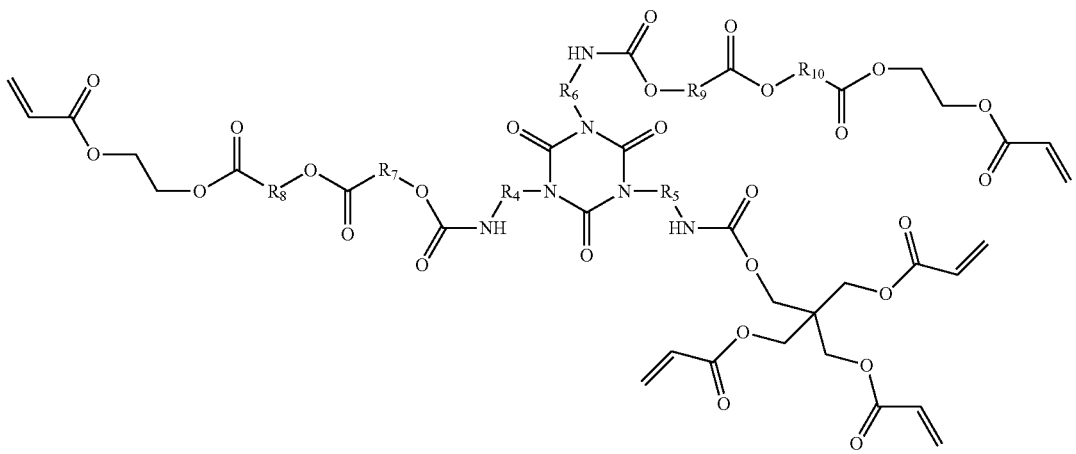

Formula (3)

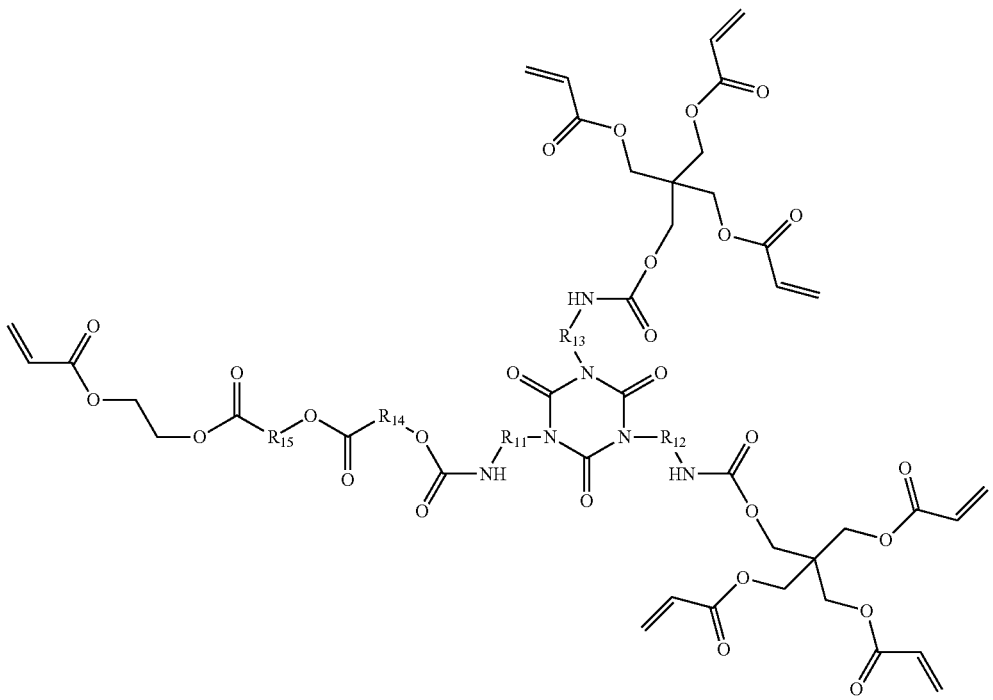

Formula (4)

in Formula (3) and Formula (4), $R_4$, $R_5$, $R_6$, $R_{11}$, $R_{12}$ and $R_{13}$ each independently represents —$(CH_2)_n$—, wherein n is an integer of 2 to 12, $R_7$, $R_8$, $R_9$, $R_{10}$, $R_{14}$ and $R_{15}$ is —$(CH_2)_5$—.

More specifically, in Formula (3) and Formula (4), $R_4$, $R_5$, $R_6$, $R_{11}$, $R_{12}$ and $R_{13}$ each independently represents —$(CH_2)_n$—, preferably n is an integer of 2 to 10; more preferably n is an integer of 4 to 8; even more preferably n is 6.

The specific examples of the urethane compound of the invention may be represented by Formula (A), Formula (B) and Formula (C), wherein the urethane compound represented by Formula (A), Formula (B) and Formula (C) is obtained by the reaction of 2-hydroxyethyl acrylate and pentaerythritol triacrylate with the triisocyanate compound. More specifically, the CAS number of the urethane compound represented by Formula (A), Formula (B) and Formula (C) is 107596-08-7, 102404-91-1 and 107596-14-5 respectively.

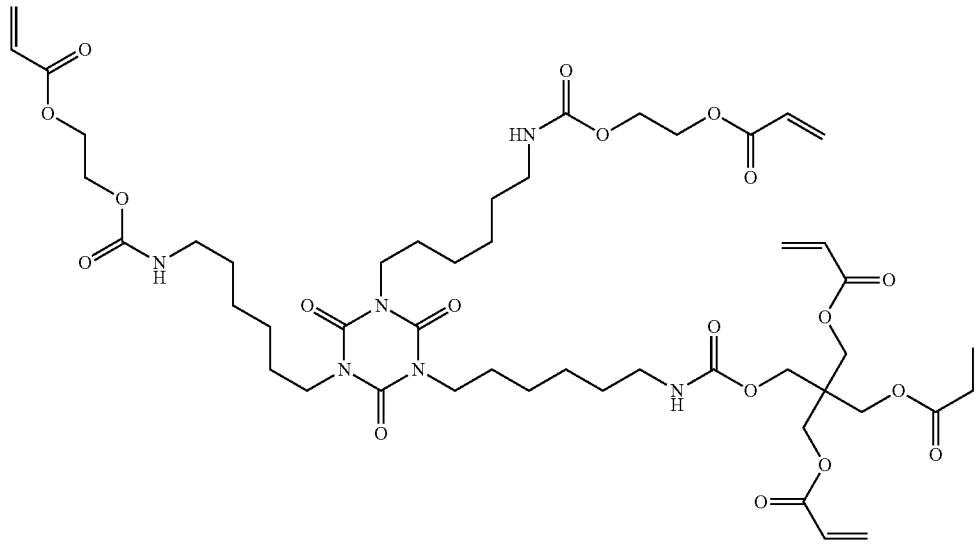

Formula (A)

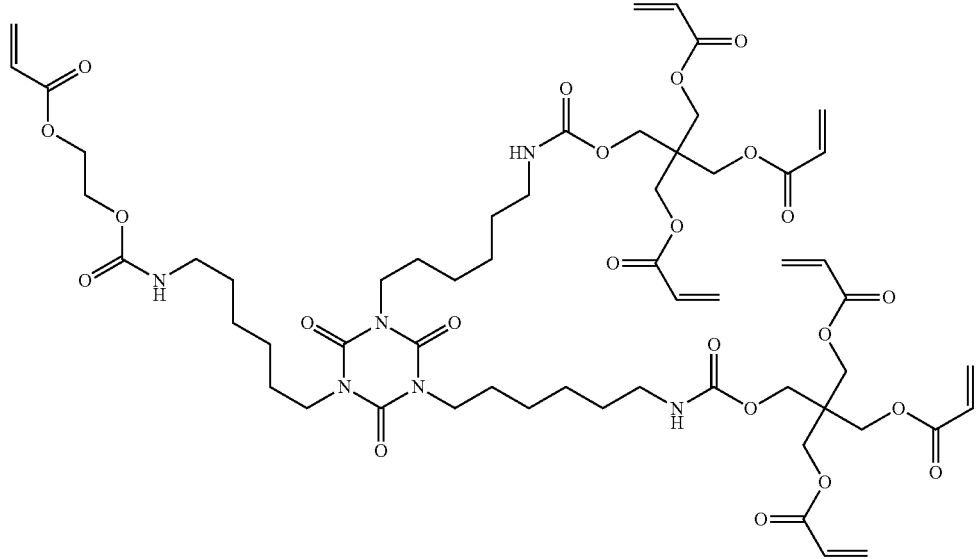

Formula (B)

-continued

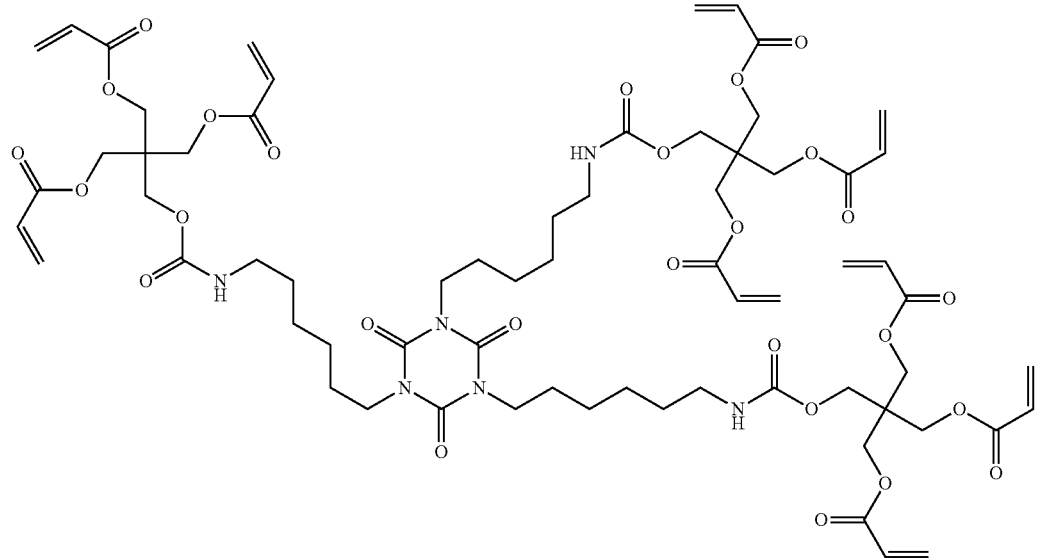

Formula (C)

The specific examples of the urethane compound of the invention may be represented by Formula (D), Formula (E) and Formula (F), wherein the urethane compound represented by Formula (D), Formula (E) and Formula (F) is obtained by the reaction of pentaerythritol triacrylate and caprolactone acrylate with the triisocyanate compound. More specifically, the CAS number of Formula (D) is 1046440-95-2. Regarding the synthesis process of the urethane compound represented by Formula (E) and Formula (F), it will be described in detail in the experimental examples shown below,

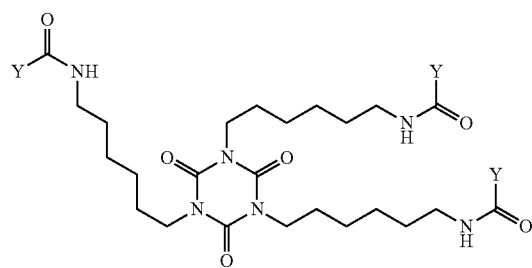

Formula (D)

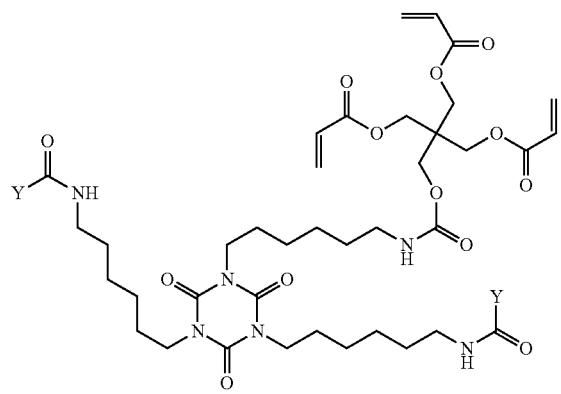

Formula (E)

-continued

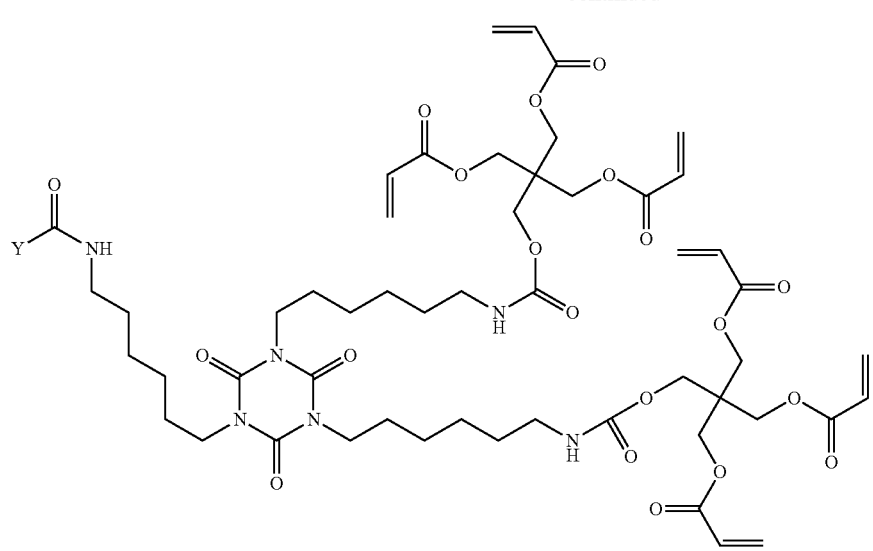

Formula (F)

in Formula (D), Formula (E) and Formula (F), Y represents a residue obtained by removing a hydrogen from a hydroxyl group of the caprolactone acrylate.

The urethane compound of the invention is used for the reaction with the copolymerizable monomer to obtain a branched copolymer. That is, the urethane compound of the invention has the effect of a branching agent such that the molding product can have a high melt tension to aid in the thinning processing and to improve production stability.

<Copolymerizable Monomer>

The copolymerizable monomer of the invention is at least one selected from the group consisting of a styrene based monomer, an acrylonitrile based monomer and a (meth) acrylate based monomer.

Specific examples of the styrene based monomer may include but are not limited to styrene, α-methyl styrene, p-tert-butyl styrene, p-methyl styrene, o-methyl styrene, m-methyl styrene, 2,4-dimethyl styrene, ethyl styrene, α-methyl-p-methyl styrene or bromostyrene. Preferably, the styrene based monomer is styrene, α-methyl styrene, or a combination thereof. The styrene based monomer used in the invention can be employed as a single monomer, or may be used in a combination of two or more of the monomers.

The acrylonitrile based monomer may be used alone or used in combination. The acrylonitrile based monomer may include but are not limited to acrylonitrile or α-methyl acrylonitrile. Preferably, the acrylonitrile based monomer is acrylonitrile.

Specific examples of the (meth)acrylate based monomer may include but are not limited to methyl acrylate, ethyl acrylate, isopropyl acrylate, butyl acrylate, polyethylene glycol diacrylate, methyl methacrylate, ethyl methacrylate, propyl methacrylate, butyl methacrylate, benzyl methacrylate, hexyl methacrylate, cyclohexyl methacrylate, dodecyl methacrylate, 2-hydroxyethyl methacrylate, glycidyl methacrylate, dimethylaminoethyl methacrylate, ethylene dimethacrylate or neopentyl dimethacrylate etc. Preferably, the (meth)acrylate based monomer is butyl acrylate, methyl methacrylate and butyl methacrylate.

<Branched Copolymer>

The branched copolymer of the invention is obtained by the copolymerization of the urethane compound and the copolymerizable monomer described above, wherein the urethane compound has an effect of a branching agent. More specifically, based on an amount of the copolymerizable monomer being 100 parts by weight, an amount of the urethane compound is preferably 0.005 parts by weight to 0.8 parts by weight, and more preferably 0.01 parts by weight to 0.4 parts by weight.

The weight average molecular weight of the branched copolymer of the invention is preferably 100,000 to 600,000, more preferably 150,000 to 500,000, and most preferably 200,000 to 450,000.

When the molar mass of the branched copolymer of the invention is in the range of $2\times10^5$ g/mol to $3\times10^6$ g/mol, the average radius of gyration is preferably 30 nm to 50 nm, and a good branching effect is obtained.

A molding product is provided in the invention and is formed by the thermoplastic resin composition described above. The method of manufacturing the molding product is not particularly limited, and thermoforming or vacuum forming or the combination of the above process may be used. Conventional methods may be used in thermoforming and vacuum forming, hence, its description thereof will not be repeated herein.

The following experimental examples will be used to describe the thermal plastic resin composition of the invention. However, the following experimental examples are not intended to limit the invention.

EXPERIMENTAL EXAMPLE

The following experimental examples are used to prove that the thermoplastic resin composition of the invention includes a branched copolymer, and a molding product having a high melt tension can be obtained.

Meanwhile, the following synthesis example 1 and synthesis example 2 are used to explain the synthesis process of the urethane compound represented by Formula (E) and Formula (F) described above.

Preparation of Urethane Compound

Synthesis Example 1

The urethane compound of synthesis example 1 can be prepared by using the following reaction process 1.

[Reaction process 1]

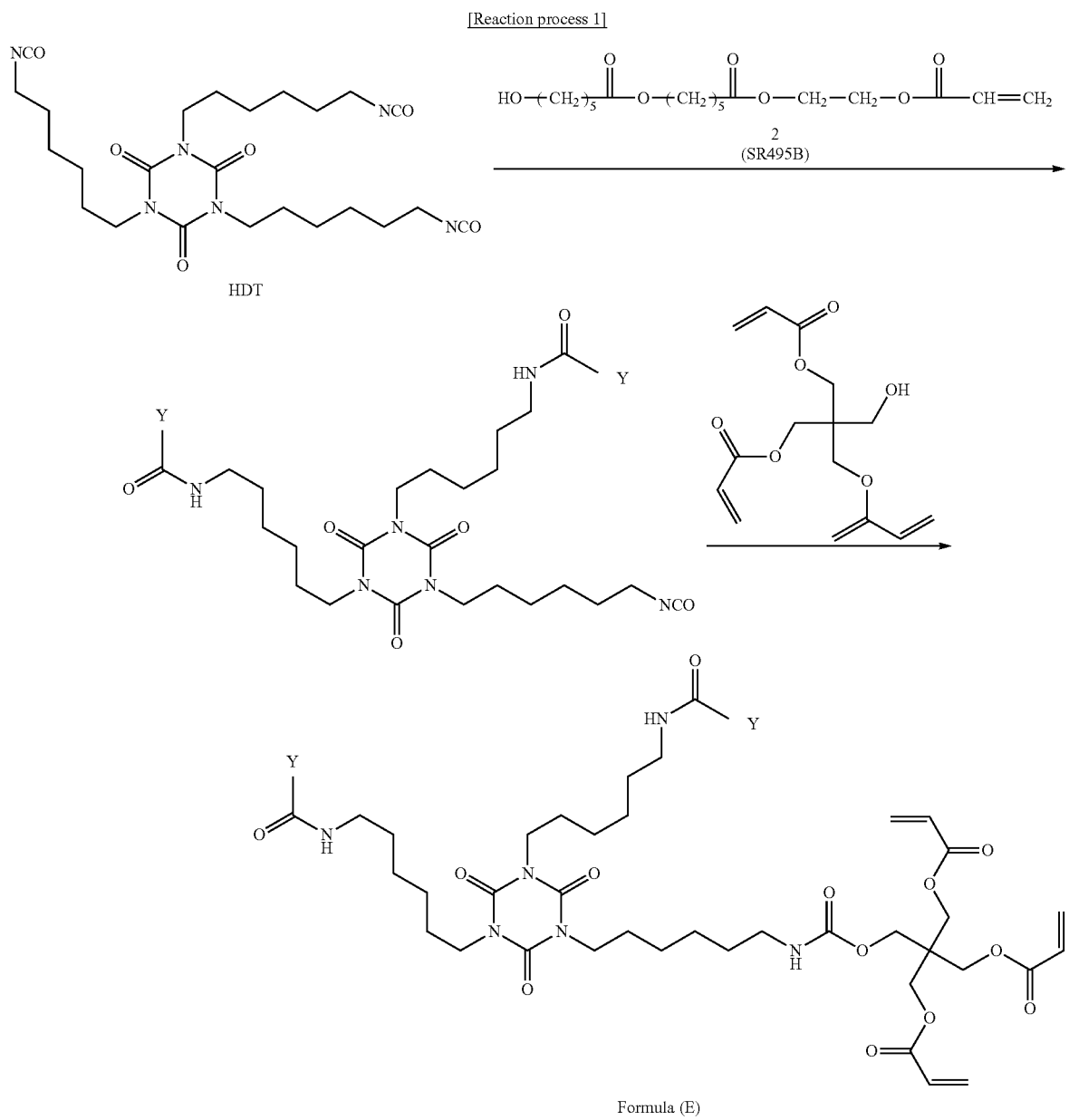

Formula (E)

Y represents a residue obtained by removing a hydrogen from a hydroxyl group of SR495B (caprolactone acrylate).

In a four-necked reaction flask, 1.9 parts by weight of MEHQ (monomethyl ether hydroquinone), 600 parts by weight of HDT (product name: Desmodur® N3300, a trimer of hexamethylene diisocyanate (hereinafter HDI)) prepared by Bayer, 1361 parts by weight of EB (ethylene glycol monobutyl ether) and 1.9 parts by weight of dibutyltin dilaurate (DBDTL) were added, and then stirred to form a mixture solution. Then, 757 parts by weight of a product name SR495B (caprolactone acrylate) prepared by Sartomer were added drop-wise to the above mixture solution under room temperature. The mixture solution was then raised to 50° C. and reacted for 1 hour. Next, 514 parts by weight of PETIA (product name EM235-1 (pentaerythritol triacrylate)) prepared by Eternal Materials Co., Ltd. was dissolved into 514 parts by weight of EB and added drop-wise to the reaction. The reaction mixture was raised to 75° C. and reacted for 5 hours. After completion of the reaction, the temperature was lowered to room temperature and the reaction product was precipitated and filtered to obtain the urethane compound represented by Formula (E).

FIG. 1 is a $^1$H-NMR spectrum of the urethane compound obtained in synthesis example 1. The Ultrashield 400 MHz nuclear magnetic resonance spectroscopy manufactured by Bruker was used to determine the $^1$H-NMR (NMR of hydrogen) results. As shown in FIG. 1, the signal of H (3.5 ppm) from the OH functional group in SR495B is disappeared, and the signal of H (3.2 ppm) from HDT is shifted. As such, a reaction is confirmed.

Figure 2:
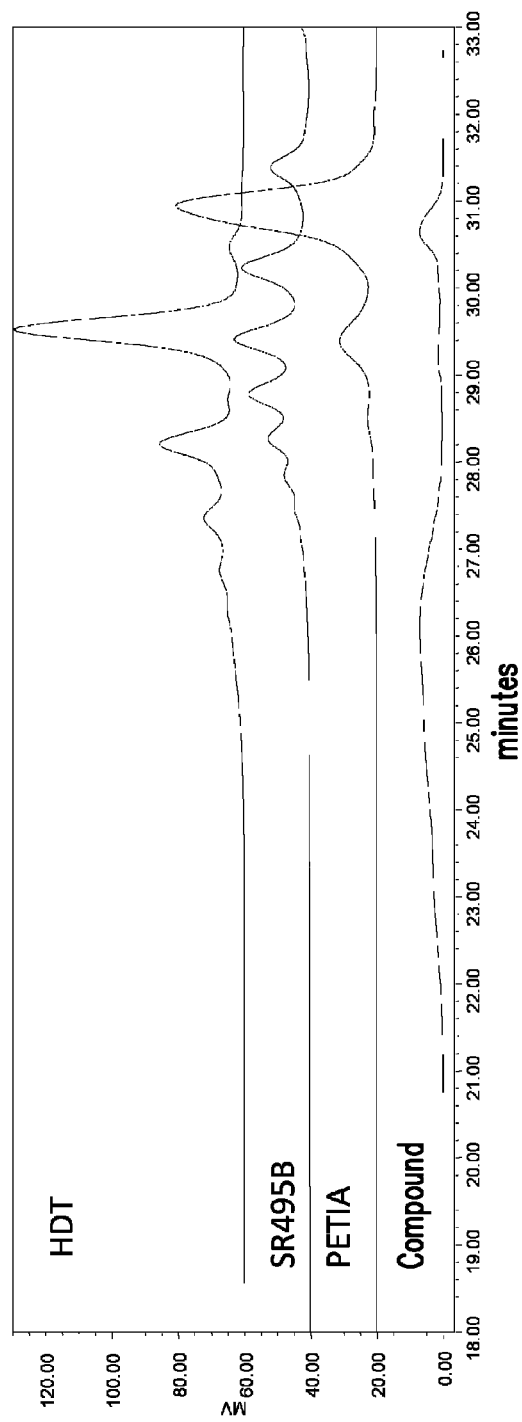
FIG. 2 is a GPC chromatogram of the urethane compound obtained in synthesis example 1.

FIG. 2 is a GPC chromatogram of the urethane compound obtained in synthesis example 1. The gel permeation chromatography (GPC) manufactured by Waters equipped with a differential refractive index detector (Waters RI-2414) and ultraviolet visible light detector (Waters PDA-2996) was used for analysis. The analytical conditions are as follows, column: MZ-Gel Sdplus linear 5 μm 300×8.0 mm; mobile phase: THF (flow velocity 0.5 ml/min). As shown in FIG. 2, the low molecular weight peak disappears while the high molecular weight peak appears. As such, a reaction is confirmed.

Synthesis Example 2

The urethane compound of synthesis example 2 can be prepared by using the following reaction process 2.

Y represents a residue obtained by removing a hydrogen from a hydroxyl group of SR495B (caprolactone acrylate).

In a four-necked reaction flask, 2 parts by weight of MEHQ (monomethyl ether hydroquinone), 600 parts by weight of HDT (product name: Desmodur® N3300) prepared by Bayer, 1036.5 parts by weight of EB (ethylene glycol monobutyl ether) and 2 parts by weight of dibutyltin dilaurate (DBDTL) were added, and then stirred to form a mixture solution. Then, 432.5 parts by weight of a product name SR495B (caprolactone acrylate) prepared by Sartomer were added drop-wise to the above mixture solution under room temperature. The mixture solution was then raised to 50° C. and reacted for 1 hour. Next, 955 parts by weight of PETIA (product name EM235-1 (pentaerythritol triacrylate)) was dissolved into 955 parts by weight of EB and

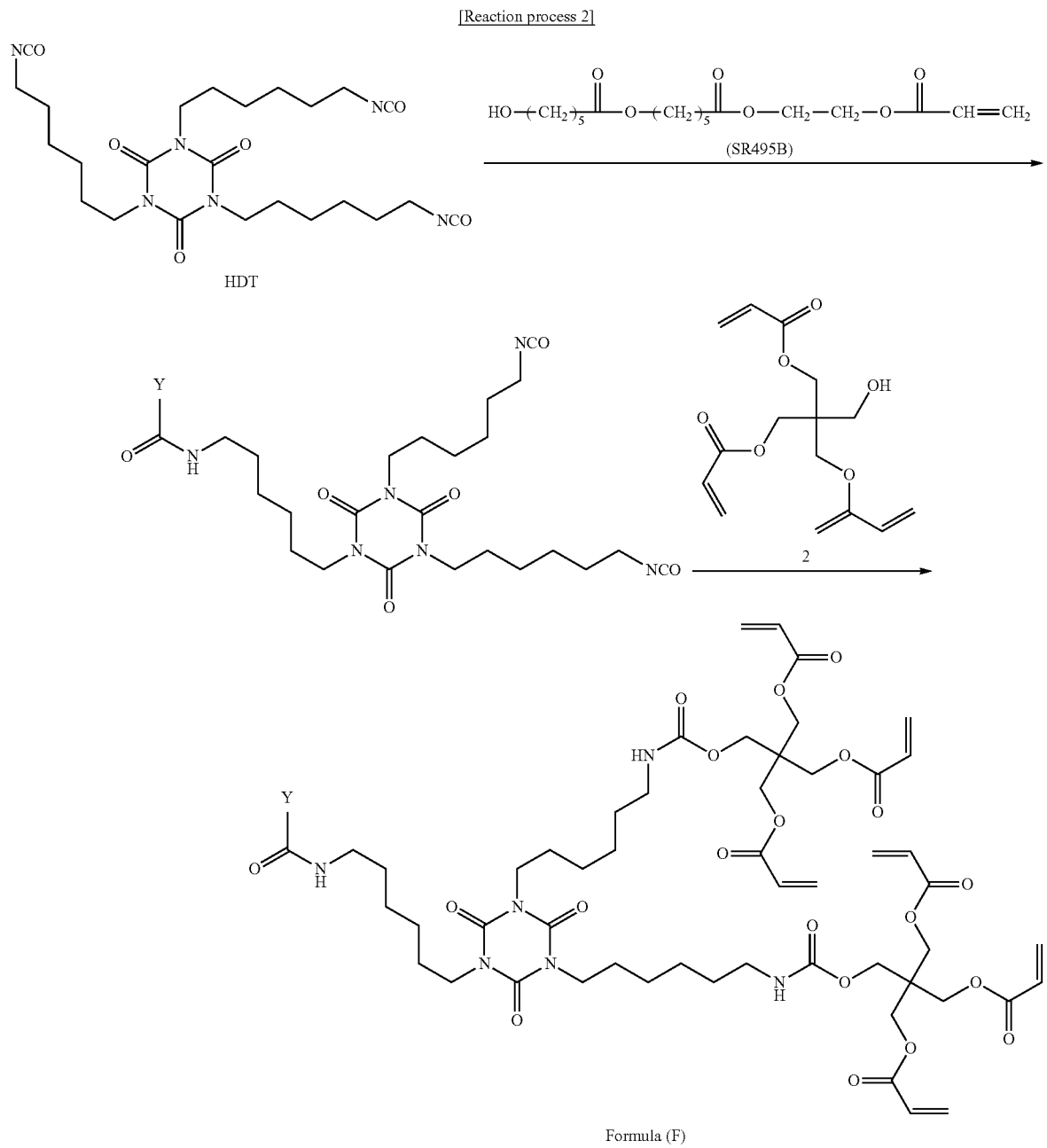

added drop-wise to the reaction. The reaction mixture was raised to 75° C. and reacted for 5 hours. After completion of the reaction, the temperature was lowered to room temperature and the reaction product was precipitated and filtered to obtain the urethane compound represented by Formula (F).

Figure 3:
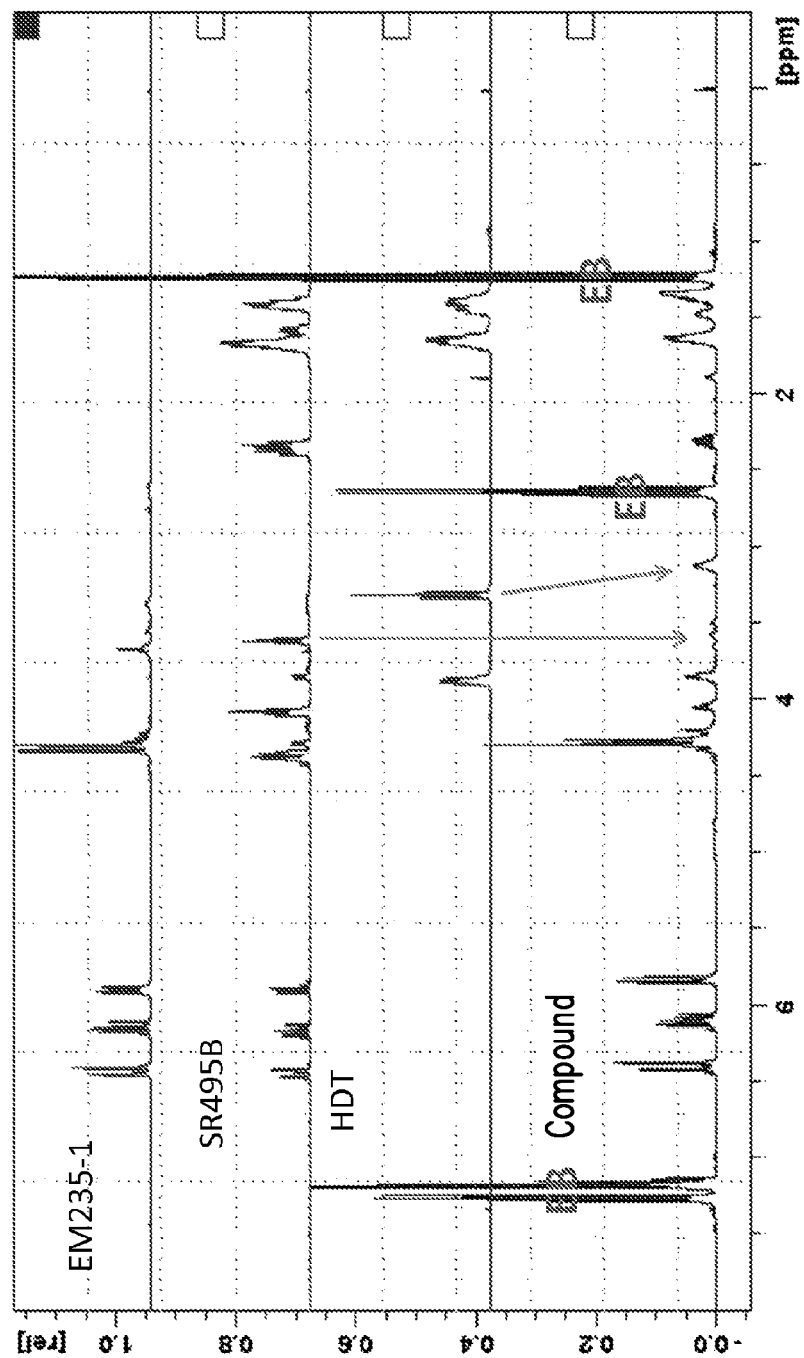
FIG. 3 is a $^1$H-NMR spectrum of the urethane compound obtained in synthesis example 2.

FIG. 3 is a $^1$H-NMR spectrum of the urethane compound obtained in synthesis example 2. As shown in FIG. 3, the signal of H (3.5 ppm) from the OH functional group in SR495B is disappeared, and the signal of H (3.2 ppm) from HDT is shifted. As such, a reaction is confirmed.

Figure 4:
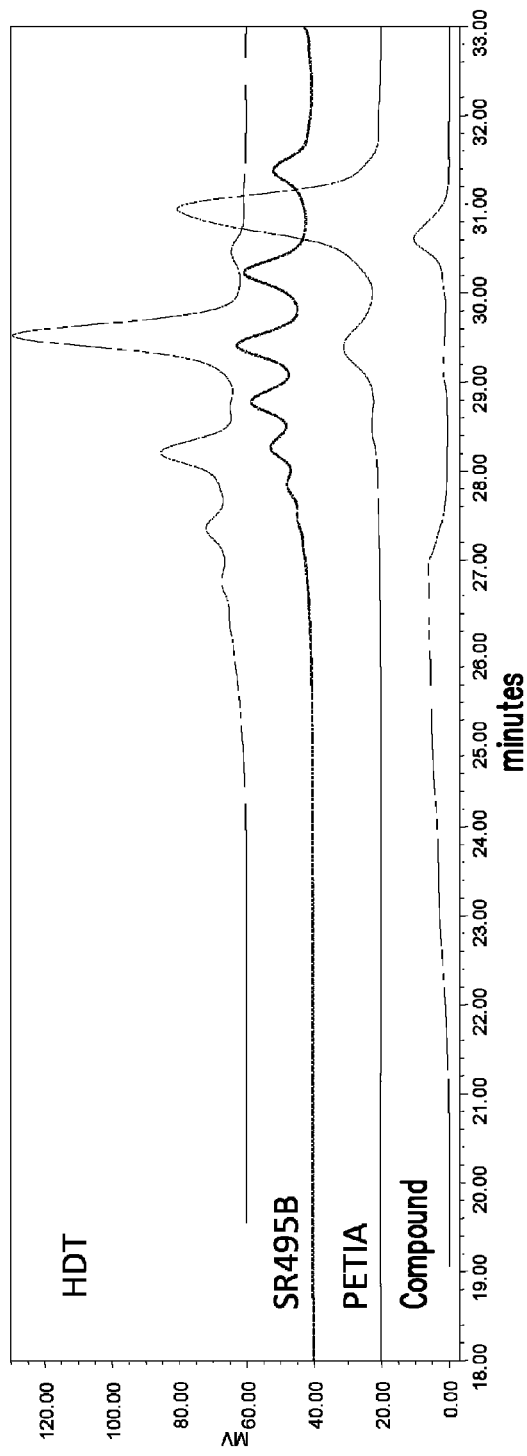
FIG. 4 is a GPC chromatogram of the urethane compound obtained in synthesis example 2.

FIG. 4 is a GPC chromatogram of the urethane compound obtained in synthesis example 2. As shown in FIG. 4, the low molecular weight peak disappears while the high molecular weight peak appears. As such, a reaction is confirmed.

The $^1$H-NMR spectrum of FIG. 3 and the $^1$H-NMR spectrum of FIG. 1 were measured the same way, and the GPC chromatogram of FIG. 4 and the GPC chromatogram of FIG. 2 were measured the same way, thus the details will not be repeated herein.

Synthesis of Branched Copolymer

Experimental Example 1

100 parts by weight of styrene monomer and 8 parts by weight of ethylbenzene, and in the presence of 150 ppm of 1,1-di-tert-butyl peroxy-3,3,5-trimethylcyclohexane (TX-29A), 250 ppm of n-dodecyl mercaptan, 110 ppm of octadecyl-3-(3',5'-di-t-butyl-4'-hydroxyphenyl)propionate (IX-1076, manufactured by CIBA) and 220 ppm of tri-(2,4-di-t-butyl-phenyl)phosphate (P-168), 550 ppm of the urethane compound (CAS number: 107596-08-7) represented by Formula (A) was added as a branching agent for reaction. The reaction conditions are as follows: pumping at a flow rate of 40 liters per hour into three cylindrical flow reactors each having a capacity of 110 liters that are connected in series, the reaction is maintained at an inlet temperature of 115° C., 130° C. and 150° C. respectively, the final conversion rate is at 80 weight %, after heating with a heater at 260° C. and removing the unreacted monomer and inert solvent by a devolatilization apparatus under 15 torr of vacuum, the copolymer is obtained after extrusion from the apparatus.

The type of branching agent, usage amount and the number of reactive function groups used in experimental example 1 are presented in Table 1 below.

Experimental Example 2 to Experimental Example 6

The synthesis method is the same as experimental example 1. The difference being that different types and amount of the urethane compound was added as a branching agent for reaction. The type and usage amount of the urethane compound are presented in Table 1 below.

In experimental example 2 to experimental example 6, the urethane compounds represented by Formula (B), Formula (C), Formula (D), Formula (E) and Formula (F) were added for reaction respectively. Herein, the CAS number of the urethane compound represented by Formula (B), Formula (C) and Formula (D) are respectively 102404-91-1, 107596-14-5 and 1046440-95-2. The urethane compound represented by Formula (E) and Formula (F) are prepared by synthesis example 1 and synthesis example 2 described above.

Experimental Example 7

69.5 parts by weight of styrene monomer, 30.5 parts by weight of acrylonitrile monomer and 25 parts by weight of ethylbenzene, and in the presence of 200 ppm of 1,1-di-tert-butyl peroxy-3,3,5-trimethylcyclohexane (TX-29A) and 150 ppm of t-dodecyl mercaptan, 900 ppm of the urethane compound represented by Formula (F) (prepared by synthesis example 2) was added for reaction. The reaction conditions are as follows: pumping at a flow rate of 21 kg per hour into two of a continuous stirred tank reactor (CSTR) and a cylindrical flow reactor connected in series and having a capacity of 40 liters and 110 liters respectively, the reaction is maintained at an inlet temperature of 105° C., 105° C. respectively, the final solid content is 50 weight %, after heating with a heater at 260° C. and removing the unreacted monomer and inert solvent by a devolatilization apparatus under 15 torr of vacuum, the copolymer is obtained after extrusion from the apparatus.

Comparative Example 1 to Comparative Example 2

The synthesis method is the same as experimental example 1. The difference being that different types and amount of branching agent were added for reaction. The type and usage amount of the branching agent are presented in Table 1 below.

The branching agents with the product name EM231 and DR-M451 are both prepared by Eternal Materials Co., Ltd., wherein the branching agent EM231 represents trimethylolpropane triacrylate (TMPTA), and DR-M451 represents melamine acrylate. The branching agents EM231 and DR-M451 have the chemical structures as shown below.

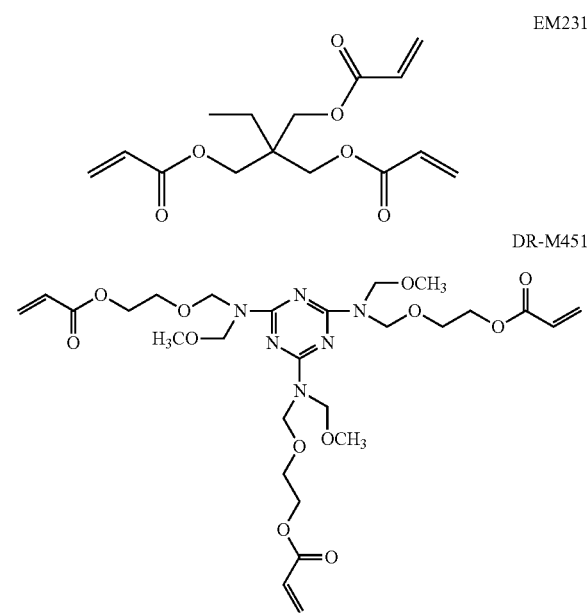

Comparative Example 3

The synthesis method is the same as experimental example 1, the difference being that no branching agent is added for reaction.

Comparative Example 4

The synthesis method is the same as experimental example 7, the difference being that 1100 ppm of EM231 was added for reaction.

TABLE 1

| | Experimental example 1 | Experimental example 2 | Experimental example 3 | Experimental example 4 | Experimental example 5 | Experimental example 6 | Comparative example 1 | Comparative example 2 |
|---|---|---|---|---|---|---|---|---|
| Branching agent | Formula (A) | Formula (B) | Formula (C) | Formula (D) | Formula (E) | Formula (F) | EM231 | DR-M451 |
| Usage amount (ppm) | 550 | 450 | 400 | 1050 | 650 | 500 | 350 | 875 |
| Number of reactive functional groups (mmole) | 0.27 | 0.26 | 0.26 | 0.22 | 0.22 | 0.24 | 0.35 | 0.41 |

Evaluation 1: Determination of the Weight Average Molecular Weight of the Copolymer The weight average molecular weight of the copolymer of experimental example 1 to experimental example 7 and comparative example 1 to comparative example 4 were measured using the method described below. The gel permeation chromatography manufactured by Waters equipped with a differential refractive index detector (Waters RI-2414) and ultraviolet visible light detector (Waters PDA-2996) was used for analysis. The analytical conditions are as follows, column: MZ-Gel Sdplus linear 5 μm 300×8.0 mm; mobile phase: THF (flow velocity 0.5 ml/min). The evaluation results are presented in Table 2 and Table 3 below.

Evaluation 2: Determination of the Average Radius of Gyration of the Copolymer

The average radius of gyration [R(avg)] of the copolymer of experimental example 1 to experimental example 6 and comparative example 1 to comparative example 3 were measured in a molar mass range of $2 \times 10^5$ to $3 \times 10^6$ g/mol using the method described below. The gel permeation chromatography manufactured by Waters in combination with the DAWN8+ multi-angle laser light scattering (MALLS) model and the ViscoStar-II viscometer model manufactured by Wyatt Technology Corporation were used for analysis. The analytical conditions are as follows, column: MZ-Gel Sdplus linear 5 μm 300×8.0 mm; mobile phase: THF (flow velocity 0.5 ml/min). The evaluation results are presented in Table 2 below.

Evaluation 3: Determination of the Elongational Viscosity of the Copolymer

The elongational viscosity of the copolymer of experimental example 1 to experimental example 6 and comparative example 1 to comparative example 3 were measured using the method described below. The Rheometer ARES-G2 manufactured by TA instrument was used for analysis at a temperature of 170° C. and a shear rate of 0.5/s. The evaluation results are presented in Table 2 below.

Evaluation 4: Gelation Assessment of the Copolymer

The gelation assessment of the copolymer of experimental example 1 to experimental example 7 and comparative example 1 to comparative example 4 were performed using the method described below. By extruding a film having a thickness of 20 μm and selecting a range of 5×20 cm, the gelation number greater than 70 μm was observed using an optical surface defect analyzer (manufactured by Nagase Taiwan Co., Ltd.). The following criteria were used for evaluation, and the evaluation results are shown in Table 2 and Table 3 below.

○: gelation number <15.
X: gelation number ≥15.

TABLE 2

| | | Experimental example 1 | Experimental example 2 | Experimental example 3 | Experimental example 4 | Experimental example 5 | Experimental example 6 |
|---|---|---|---|---|---|---|---|
| Branching agent | | Formula (A) | Formula (B) | Formula (C) | Formula (D) | Formula (E) | Formula (F) |
| Branched copolymer | Weight average molecular weight (Mw) | 357,000 | 354,000 | 351,000 | 354,000 | 359,000 | 358,000 |
| | Average radius of gyration (nm) | 44.4 | 48.0 | 36.2 | 34.3 | 35.2 | 42.0 |
| | Elongational viscosity (170° C.*0.5/s) (Pa*s) | 3 million | 5 million | 4 million | 3 million | 3.2 million | 3.5 million |
| | Gelation | ○ | ○ | ○ | ○ | ○ | ○ |

| | | Comparative example 1 | Comparative example 2 | Comparative example 3 |
|---|---|---|---|---|
| Branching agent | | EM231 | DR-M451 | — |
| Branched copolymer | Weight average molecular weight (Mw) | 360,000 | 364,000 | — |
| | Average radius of gyration (nm) | 21.6 | 45.4 | 19.4 |
| | Elongational viscosity (170° C.*0.5/s) (Pa*s) | 2 million | 4.5 million | 2 million |
| | Gelation | ○ | X | ○ |

TABLE 3

| | | Experimental example 7 | Comparative example 4 |
|---|---|---|---|
| Branched copolymer | Branching agent | Formula (F) | EM231 |
| | Weight average molecular weight (Mw) | 233,000 | 232,000 |
| | Gelation | ○ | X |

Regarding the number of reactive functional groups, from Table 1 it can be known that, based on 100 parts by weight of the copolymerizable monomer (units in g), when the melt volume rate (MVR) [measuring conditions: 200° C., 5 kg] of the synthesized copolymer is 1.5 cm$^3$/10 min, the amount of urethane compound denoted in experimental example 1 to experimental example 6 and the amount of branching agent denoted in comparative example 1 and comparative example 2 were respectively used and converted into the number of reactive functional groups (mmole), for instance, the number of (meth)acryoyl group can be calculated. In the case for experimental example 1, the usage amount, the molecular weight and the number of reactive functional group in one molecule of the urethane compound represented by Formula (A) are respectively 500 ppm, 1035 g/mole and 5. The calculation method for the number of reactive functional group is: usage amount÷molecular weight×the number of reactive functional group in one molecule. That is equal to: 100 (g)×550 (ppm)÷1035 (g/mole)×5=0.00027 mole=0.27 mmole. Experimental example 1 to experimental example 6 are the urethane compounds used according to the invention, wherein when the melt volume rate of the synthesized copolymer achieves 1.5 cm$^3$/10 min, its number of reactive functional groups will be lower than the number of reactive functional groups in the branching agent used in comparative example 1 and comparative example 2. Therefore, it can be known that the urethane compound used in experimental example 1 to experimental example 6 will have higher polymerization reactivity.

Regarding the average radius of gyration, it can be known from Table 2 that, experimental example 1 to experimental example 6 uses the urethane compounds of the invention as the branching agent for synthesizing the branched copolymer. Therefore, as compared to using EM231 as in comparative example 1 and where branching agents are not added for reaction as in comparative example 3, the branched copolymer synthesized in experimental example 1 to experimental example 6 when a molar mass is in the range of 2×10$^5$ to 3×10$^6$ g/mol will have a larger average radius of gyration (average radius of gyration is 30 nm to 50 nm). That is, the branching effect is better.

Regarding the elongational viscosity, it can be known from Table 2 that experimental example 1 to experimental example 6 uses the urethane compounds of the invention as the branching agent for synthesizing the branched copolymer. Therefore, as compared to using EM231 as in comparative example 1 and where branching agents are not added for reaction as in comparative example 3, the synthesized branched copolymer in experimental example 1 to experimental example 6 will have a higher elongational viscosity. Therefore, during molding (especially in thermoforming or vacuum forming), a good compressed sheet property and vacuum forming property can be maintained.

Regarding the gelation, it can be known from Table 2 that, when using DR-M451 as the branching agent for reaction in comparative example 2, although a larger average radius of gyration and higher elongational viscosity is obtained, a gelation problem also exists. In comparison, as shown in Table 2, experimental example 1 to experimental example 6 uses the urethane compounds of the invention as the branching agent for synthesizing the branched copolymer. Therefore, it can have a larger average radius of gyration and a higher elongational viscosity while the gelation problem is not observed.

Regarding the gelation, it can also be known from Table 3 that, comparative example 4 uses EM231 as the branching agent for reaction, and results revealed a gelation problem. In comparison, experimental example 7 uses the urethane compound represented by Formula (F) of the invention for reaction. Therefore, a gelation problem is not observed.

Based on the above, a thermoplastic resin composition is provided in the invention, wherein a branched copolymer is obtained by the copolymerization of a urethane compound and a copolymerizable monomer. More specifically, the urethane compounds have the effect of a branching agent during polymer synthesis and also have higher polymerization reactivity. It can be used for the reaction with the copolymerizable monomer for the synthesis of a branched copolymer when in a molar mass range of 2×10$^5$ to 3×10$^6$ g/mol, the average radius of gyration is 30 nm to 50 nm. Hence, having a good branching effect. In addition, the synthesized branched copolymer has a higher elongational viscosity. Therefore, during molding (especially in thermoforming or vacuum forming), a good compressed sheet property and vacuum forming property can be maintained. Accordingly, the molding product can have a high melt tension to aid in the thinning processing and to improve production stability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thermoplastic resin composition, comprising:
    a branched copolymer, obtained by the copolymerization of a urethane compound and a copolymerizable monomer, and based on an amount of the copolymerizable monomer being 100 parts by weight, an amount of the urethane compound is 0.005 parts by weight to 0.8 parts by weight;
    wherein the urethane compound is obtained by the reaction of a (meth)acrylate compound containing hydroxyl group with a triisocyanate compound.

2. The thermoplastic resin composition according to claim 1, wherein the triisocyanate compound is represented by Formula (1),

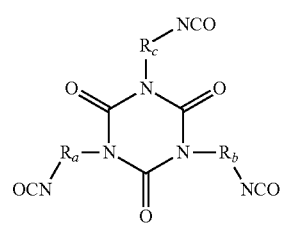

Formula (1)

in Formula (1), $R_a$, $R_b$, $R_c$ each independently represents —$(CH_2)_n$—, wherein n is an integer of 2 to 12.

3. The thermoplastic resin composition according to claim 1, wherein the (meth)acrylate compound containing hydroxyl group is at least one selected from the group consisting of 2-hydroxyethyl acrylate, pentaerythritol triacrylate and caprolactone acrylate.

4. The thermoplastic resin composition according to claim 1, wherein the urethane compound is represented by Formula (2),

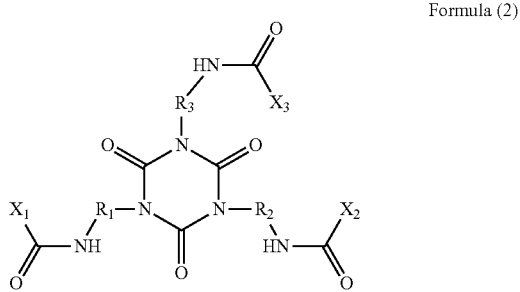

Formula (2)

in Formula (2), $R_1$, $R_2$, $R_3$ each independently represents —$(CH_2)_n$—, wherein n is an integer of 2 to 12, $X_1$, $X_2$ and $X_3$ each independently is selected from the group consisting of a residue obtained by removing a hydrogen from a hydroxyl group of 2-hydroxyethyl acrylate, a residue obtained by removing a hydrogen from a hydroxyl group of pentaerythritol triacrylate and a residue obtained by removing a hydrogen from a hydroxyl group of caprolactone acrylate.

5. The thermoplastic resin composition according to claim 4, wherein in Formula (2), $R_1$, $R_2$, $R_3$ each independently represents —$(CH_2)_n$—, and n is an integer of 2 to 10.

6. The thermoplastic resin composition according to claim 4, wherein in Formula (2), $R_1$, $R_2$, $R_3$ each independently represents —$(CH_2)_n$—, and n is an integer of 4 to 8.

7. The thermoplastic resin composition according to claim 4, wherein in Formula (2), $R_1$, $R_2$, $R_3$ each independently represents —$(CH_2)_n$—, and n is 6.

8. The thermoplastic resin composition according to claim 1, wherein based on an amount of the copolymerizable monomer being 100 parts by weight, an amount of the urethane compound is 0.01 parts by weight to 0.4 parts by weight.

9. The thermoplastic resin composition according to claim 1, wherein when the molar mass of the branched copolymer is in the range of $2\times10^5$ g/mol to $3\times10^6$ g/mol, the average radius of gyration is 30 nm to 50 nm.

10. The thermoplastic resin composition according to claim 1, wherein the copolymerizable monomer is at least one selected from the group consisting of a styrene based monomer, an acrylonitrile based monomer and a (meth)acrylate based monomer.

11. The thermoplastic resin composition according to claim 1, wherein the weight average molecular weight of the branched copolymer is 100,000 to 600,000.

12. A molding product, formed by the thermoplastic resin composition according to claim 1.

* * * * *